(12) United States Patent
Hayashi

(10) Patent No.: US 12,553,585 B2
(45) Date of Patent: Feb. 17, 2026

(54) VEHICLE LAMP

(71) Applicant: Ichikoh Industries, Ltd., Isehara (JP)

(72) Inventor: Masateru Hayashi, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/998,553

(22) PCT Filed: Jul. 18, 2023

(86) PCT No.: PCT/JP2023/026205
§ 371 (c)(1),
(2) Date: Jan. 27, 2025

(87) PCT Pub. No.: WO2024/024562
PCT Pub. Date: Feb. 1, 2024

(65) Prior Publication Data
US 2026/0029101 A1    Jan. 29, 2026

(30) Foreign Application Priority Data
Jul. 29, 2022   (JP) .................................. 2022-122173

(51) Int. Cl.
*F21S 41/00*       (2018.01)
*F21S 41/147*    (2018.01)
(Continued)

(52) U.S. Cl.
CPC ............. *F21S 41/36* (2018.01); *F21S 41/147* (2018.01); *F21S 41/26* (2018.01); *F21S 41/265* (2018.01);
(Continued)

(58) Field of Classification Search
None
See application file for complete search history.

(56) References Cited

U.S. PATENT DOCUMENTS 8,042,981 B2 * 10/2011 Kotajima ................ F21S 41/43
                                                              362/520
11,828,428 B1 * 11/2023 Chang .................... F21S 41/321
(Continued)

FOREIGN PATENT DOCUMENTS

JP          6-255419 A       9/1994
JP       2005-141918 A       6/2005
(Continued)

OTHER PUBLICATIONS

International Search Report issued Sep. 12, 2023 in PCT/JP2023/026205, filed on Jul. 18, 2023, 2 pages.

*Primary Examiner* — Gerald J Sufleta, II
(74) *Attorney, Agent, or Firm* — Oblon, McClelland, Maier & Neustadt, L.L.P.

(57) ABSTRACT

The vehicle lamp includes a first reflector portion forming a first light distribution pattern having a cutoff line by light from a first light source, a second reflector portion forming a second light distribution pattern forming at least a part of a low-beam light distribution pattern by light from a second light source, and a third reflector portion forming a third light distribution pattern by light from a third light source. The first reflector portion and the second reflector portion are provided adjacent to each other in a width direction on an attachment surface of an attachment member, and the third reflector portion is provided between the first reflector portion and the second reflector portion in the width direction and on the front side of the first reflector portion and the second reflector portion on the attachment surface.

7 Claims, 8 Drawing Sheets

(51) Int. Cl.
    *F21S 41/26*         (2018.01)
    *F21S 41/265*       (2018.01)
    *F21S 41/36*         (2018.01)
    *F21S 41/39*         (2018.01)
    *F21S 41/663*       (2018.01)
    *F21W 102/155*     (2018.01)
    *F21W 102/19*       (2018.01)
    *F21Y 115/10*       (2016.01)

(52) U.S. Cl.
    CPC ............. *F21S 41/39* (2018.01); *F21S 41/663* (2018.01); *F21W 2102/155* (2018.01); *F21W 2102/19* (2018.01); *F21Y 2115/10* (2016.08)

(56) References Cited

U.S. PATENT DOCUMENTS

| | | | |
|---|---|---|---|
| 12,092,283 B2* | 9/2024 | Ohashi | F21S 41/43 |
| 2007/0177400 A1* | 8/2007 | Tatsukawa | F21S 41/155 |
| | | | 362/514 |
| 2011/0199776 A1* | 8/2011 | Takahashi | F21S 41/255 |
| | | | 362/538 |
| 2018/0202624 A1* | 7/2018 | De Lamberterie | F21S 41/285 |
| 2020/0156528 A1 | 5/2020 | Wang et al. | |
| 2021/0215313 A1* | 7/2021 | Gromfeld | B60Q 1/0058 |
| 2022/0316679 A1* | 10/2022 | Liu | F21S 41/192 |
| 2024/0102626 A1* | 3/2024 | Laminette | F21S 41/321 |

FOREIGN PATENT DOCUMENTS

| | | | |
|---|---|---|---|
| JP | 2008-047302 A | 2/2008 | |
| JP | 2014-102903 A | 6/2014 | |

* cited by examiner

VEHICLE LAMP

TECHNICAL FIELD

The present disclosure relates to a vehicle lamp.

BACKGROUND ART

A vehicle lamp in which a low-beam light distribution unit and an additional light distribution unit are incorporated has been considered (for example, see PTL 1). The vehicle lamp can form a low-beam light distribution pattern by the low-beam light distribution unit, and can form an additional light distribution pattern on a side of the low-beam light distribution pattern by the additional light distribution unit.

CITATION LIST

Patent Literature

PTL 1: Japanese Unexamined Patent Publication No. 2005-141918

SUMMARY OF THE INVENTION

Problems to be Solved by the Invention

However, the above-described vehicle lamp is configured such that the low-beam light distribution unit and the additional light distribution unit are simply arranged in a single housing, which leads to an increase in size.

The present disclosure has been made in view of the above-described circumstances, and an object of the present disclosure is to provide a vehicle lamp capable of forming a low-beam light distribution pattern and an additional light distribution pattern on a side of the low-beam light distribution pattern while suppressing an increase in size.

Means for Solving the Problem

A vehicle lamp according to the present disclosure includes a first reflector portion that reflects light emitted from a first light source, irradiates a front of a vehicle, and that forms a first light distribution pattern having a cutoff line, a second reflector portion that reflects light emitted from a second light source and that forms a second light distribution pattern larger than the first light distribution pattern in front of the vehicle, a third reflector portion that reflects light emitted from a third light source and that forms a third light distribution pattern on a side of the first light distribution pattern or the second light distribution pattern, and an attachment member to which the first light source, the second light source, and the third light source are attached on an attachment surface, and the second light distribution pattern is formed simultaneously with the first light distribution pattern and thereby forms at least a part of a low-beam light distribution pattern, the first reflector portion and the second reflector portion are provided on the attachment surface in such a way as to be adjacent to each other in a width direction of the vehicle, and the third reflector portion is provided on the attachment surface between the first reflector portion and the second reflector portion in the width direction and in a front side of the first reflector portion and the second reflector portion in a front-rear direction of the vehicle.

Effect of the Invention

According to the vehicle lamp of the present disclosure, it is possible to form a low-beam light distribution pattern and an additional light distribution pattern on a side of the low-beam light distribution pattern while suppressing an increase in size.

MODE FOR CARRYING OUT THE INVENTION

Figure 1:
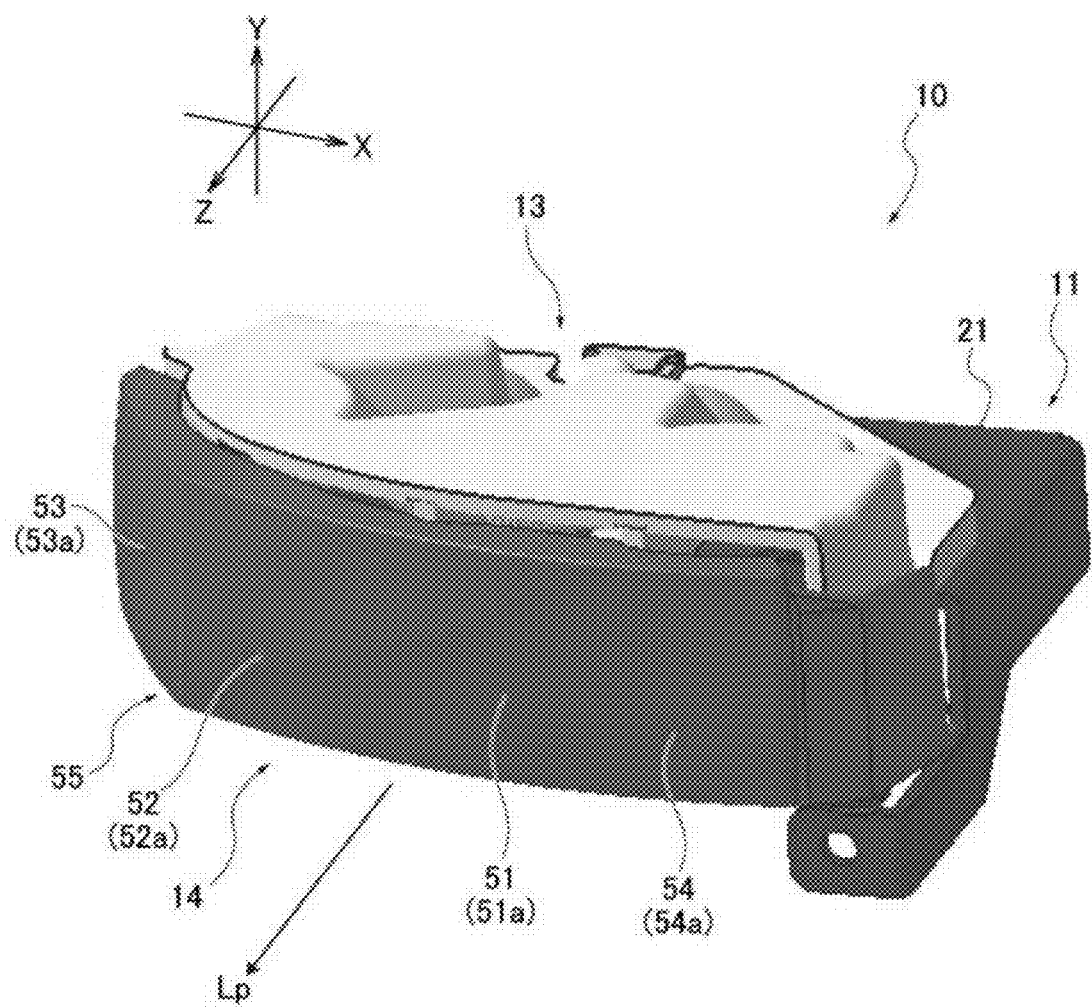
FIG. 1 is an explanatory diagram illustrating a vehicle lamp as an embodiment according to the present disclosure.

Hereinafter, a first embodiment of a vehicle lamp 10 as an example of the vehicle lamp according to the present disclosure will be explained with reference to the drawings. In FIGS. 7 to 12 illustrating respective light distribution patterns, the brightness distribution is illustrated as contour lines in which a brightness increases toward the center on a screen where a horizontal line H and a vertical line V intersect with each other with a center position O (projected optical axis Lp) of irradiation by the vehicle lamp 10 as an origin.

First Embodiment

The vehicle lamp 10 according to a first embodiment, which is an embodiment of the vehicle lamp according to the present disclosure, will be explained with reference to FIGS. 1 to 12. The vehicle lamp 10 of the first embodiment is used as a headlamp device of a vehicle such as an automobile. The headlamp device is mounted on each of right and left sides of the front of a vehicle, and is configured such that the vehicle lamp 10 is provided in a lamp chamber formed by a lamp housing whose open front end is covered with an outer lens 15 (see FIG. 5). The vehicle lamp 10 is provided in the lamp chamber via an up-down direction optical axis adjustment mechanism and a left-right direction optical axis adjustment mechanism, and appropriately irradiates the front of the vehicle. In the following explanation, a direction in which a vehicle mounted with the vehicle lamp 10 travels is defined as a front-rear direction (Z in the drawings), a vertical direction when the front-rear direction is along a horizontal plane is defined as an up-down direction (Y in the drawings), and a direction orthogonal to the front-rear direction and the up-down direction (horizontal direction) is defined as a width direction (X in the drawings). Herein, a vehicle lamp 10 provided on a right side of the vehicle and a vehicle lamp 10 provided on a left side of the vehicle have basically the same configuration, but are reversed in a width direction (left and right). Therefore, explanation will be made below by using the vehicle lamp 10 provided on the right side.

Figure 2:
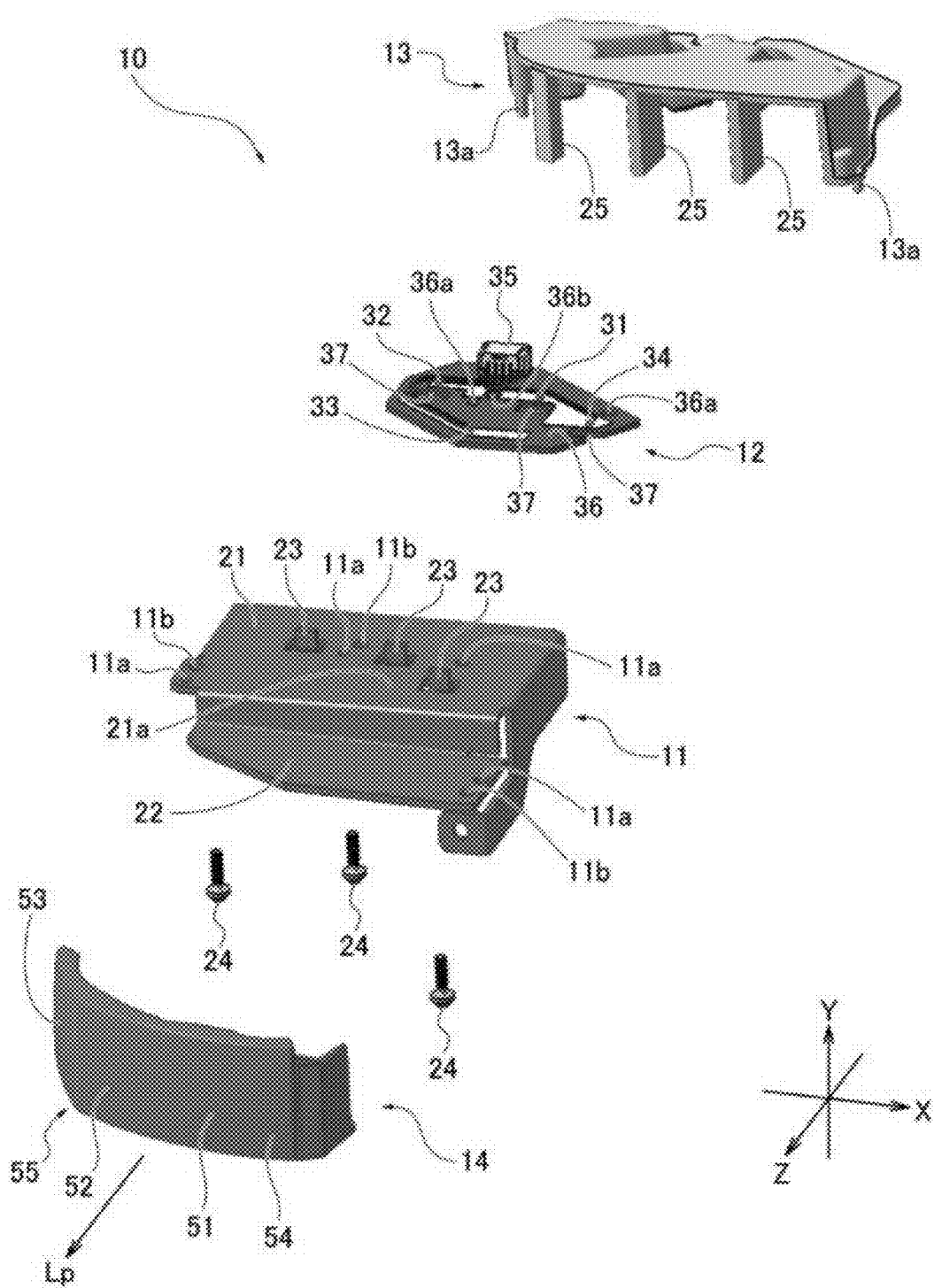
FIG. 2 is an explanatory diagram illustrating a configuration of the vehicle lamp in an exploded manner.

As illustrated in FIGS. 1 and 2, the vehicle lamp 10 according to the first embodiment constitutes a projector-type lamp unit in which a light source portion 12, a reflector member 13, and a projection lens 14 are attached to an attachment member 11. The attachment member 11 is a section where the light source portion 12 is provided, is formed of an aluminum plate, aluminum die-casting, or resin which has thermal conductivity, and functions as a heat sink that releases heat generated in the light source portion 12 to the outside as a whole. The attachment member 11 includes a light source attachment portion 21 and a lens attachment portion 22.

The light source attachment portion 21 has a flat plate shape orthogonal to the up-down direction, and the light source portion 12 is attached to a predetermined position. The light source attachment portion 21 is provided with three light shielding walls 23. Each of the light shielding walls 23 has a plate shape protruding upward in the up-down direction in such a way as to be orthogonal to the light source attachment portion 21. and individually corresponds to a first light source 31, a second light source 32, and a fourth light source 34, which will be described below, of the light source portion 12. Each of the light shielding walls 23 is provided on the front side in the front-rear direction with respect to the corresponding light source, and absorbs or diffuses light from the corresponding light source. Each of the light shielding walls 23 prevents the light from the corresponding light source from illuminating an upper side of a cutoff line CL in a low-beam light distribution pattern LP, which will be described below; formed by the light from the corresponding light source, on a screen where a horizontal line H and a vertical line V intersect with each other at a center position O on a projected optical axis Lp, and the position of the light shielding wall 23 with respect to the corresponding light source is set.

The lens attachment portion 22 has a flat plate shape substantially orthogonal to the up-down direction, is provided on a front side of the light source attachment portion 21 in the front-rear direction, and is positioned lower than the light source attachment portion 21 in the up-down direction with a step. The lens attachment portion 22 constitutes a section to which the projection lens 14 is attached, and the projection lens 14 is positioned on a front side of the light source portion 12 attached to the light source attachment portion 21 in the front-rear direction.

The attachment member 11 is provided with four positioning holes 11a and three screw insertion holes 11b. Each positioning hole 11a and each screw insertion hole 11b are provided in pairs. A positioning protrusion 13a of the reflector member 13, which will be described below; can be fitted into each positioning hole 11a. A screw 24 can be inserted into each screw insertion hole 11b. The attachment member 11 may be provided with a plurality of heat dissipation fins, and heat generated by the light source portion 12 attached to the light source attachment portion 21 may be dissipated to the outside mainly from each heat dissipation fin. The attachment member 11 is fixed to a lamp housing via a bracket not to be illustrated. In the attachment member 11, a cooling fan unit may be provided as appropriate in order to increase cooling efficiency.

The light source portion 12 includes a first light source 31, a second light source 32, a third light source 33, a fourth light source 34 (see FIG. 2, etc.), a connector terminal 35, and a substrate 36 on which these components are mounted. The four light sources (31 to 34) are configured by a light emitting element such as a light emitting diode (LED). The four light sources (31 to 34) are provided at positions corresponding to respective reflector portions (41 to 44) to be described below. This positional relationship will be described below.

The connector terminal 35 is electrically connected to a wiring pattern of the substrate 36, and a connection connector connected to a lighting control circuit is detachable. The connector terminal 35 is provided at a lower end portion of the substrate 36 in the up-down direction, and the connection connector can be easily attached and detached. The connector terminal 35 makes it possible to supply electric power from the lighting control circuit to each of the light sources (31 to 34) via the wiring pattern by attaching the connection connector thereto.

The substrate 36 has a plate shape formed of an aluminum substrate, and each of the light sources (31 to 34) is mounted on the substrate 36. The substrate 36 may be formed of a resin material such as a glass epoxy substrate, or may be formed of an other material. The substrate 36 is provided with a wiring pattern that electrically connects each of the light sources (31 to 34) and the connector terminal 35. In the substrate 36, a positioning hole 36a is provided corresponding to the positioning hole 11a at the center of the light source attachment portion 21 of the attachment member 11, and a screw insertion hole 36b is provided corresponding to the screw insertion hole 11b near the positioning hole 11a. The substrate 36 is attached between the attachment member 11 (light source attachment portion 21) and the reflector member 13 by inserting the positioning protrusion 13a of the reflector member 13, which will be described below, into the positioning hole 36a and screwing the screw 24, which is inserted into the screw insertion hole 36b, into a screw hole 13b of the reflector member 13, which will be described below. Then, the substrate 36 makes the mounted light sources (31 to 34) face the corresponding reflector portions (41 to 44), respectively. The substrate 36 appropriately supplies electric power from the lighting control circuit via the connector terminal 35 and appropriately turns on the light sources (31 to 34).

The substrate 36 is provided with a light shielding wall slit 37 in front of each of the first light source 31, the second light source 32, and the fourth light source 34. The light shielding wall slit 37 is positioned in front of the corresponding light source, and can receive each light shielding wall 23 provided in the light source attachment portion 21 of the attachment member 11. Therefore, when the light source portion 12 is attached between the attachment member 11 and the reflector member 13, the light shielding wall 23 can be positioned in front of each of the first light source 31, the second light source 32, and the fourth light source 34 through the light shielding wall slit 37. Accordingly, in the light source portion 12, it is possible to prevent the light from the first light source 31, the second light source 32, and the fourth light source 34 from illuminating the upper side of the cutoff line CL in the low-beam light distribution pattern LP to be described below.

The reflector member 13 is a molded product made of a resin material, and is integrally provided with a first reflector portion 41, a second reflector portion 42, a third reflector portion 43, and a fourth reflector portion 44 (see FIG. 2, etc.). Each of the reflector portions (41 to 44) has a reflective surface Rs curved in such a way as to cover the corresponding light source (31 to 34), and the reflective surface Rs reflects light emitted from the corresponding light source (31 to 34) to the projection lens 14 side. The reflective surface Rs is provided on the inner side of each reflector portion (41 to 44). Each reflective surface Rs is a bowl-shaped free-form surface based on an ellipse having a first focal point at the corresponding light source (31 to 34) (the center position thereof or the vicinity thereof) and a second focal point near a lens portion (51 to 54). which will be described below, of the corresponding projection lens 14. Thus, each of the reflector portions (41 to 44) can cause the light emitted from each of the light sources (31 to 34) near the first focal point to efficiently travel to the corresponding lens portion (51 to 54). The positional relationship between the reflector portions (41 to 44) and the like will be described below.

Figure 3:
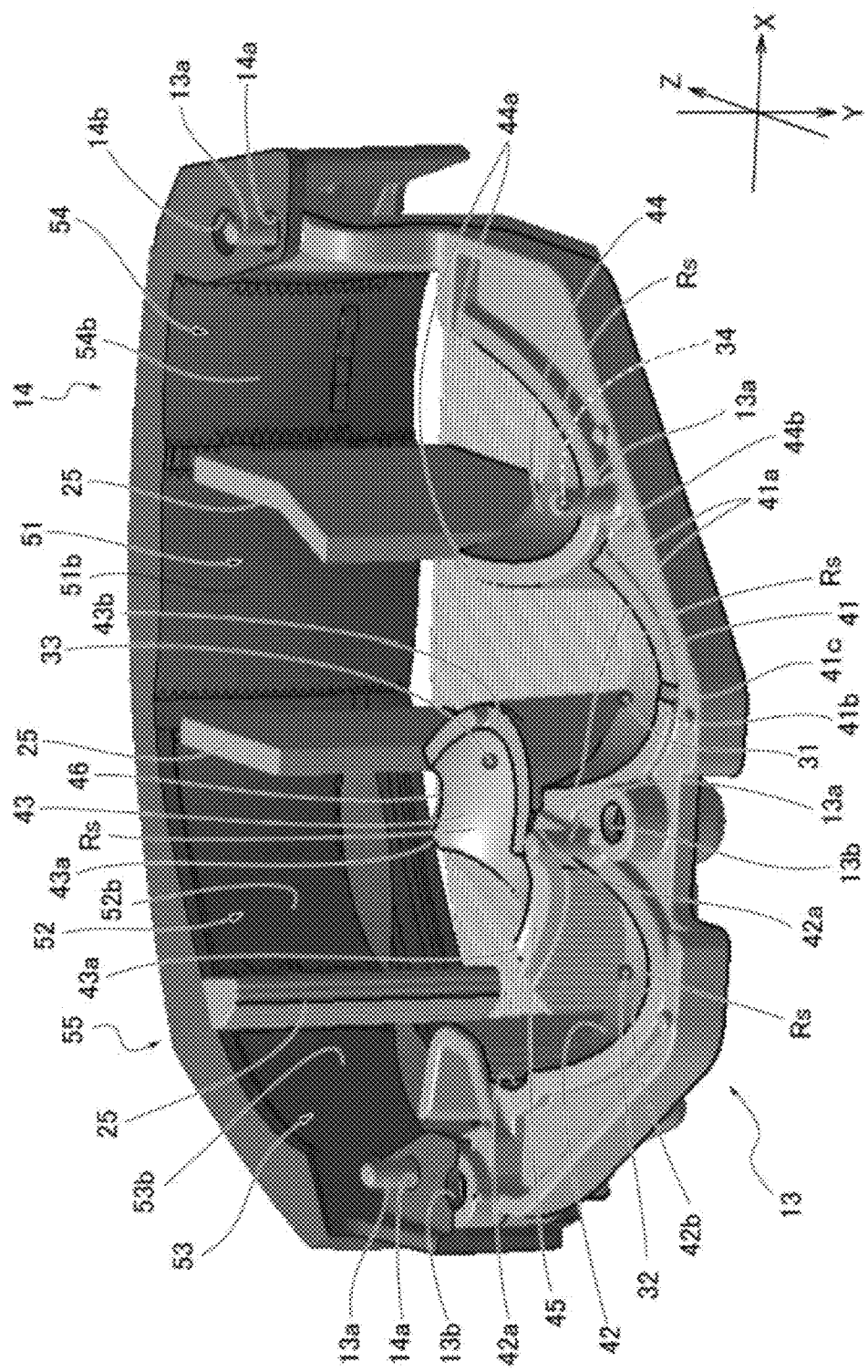
FIG. 3 is an explanatory diagram illustrating a state viewed obliquely from below in a vertically inverted manner for understanding a positional relationship among a projection lens, a reflector member, and light sources in the vehicle lamp.
Figure 4:
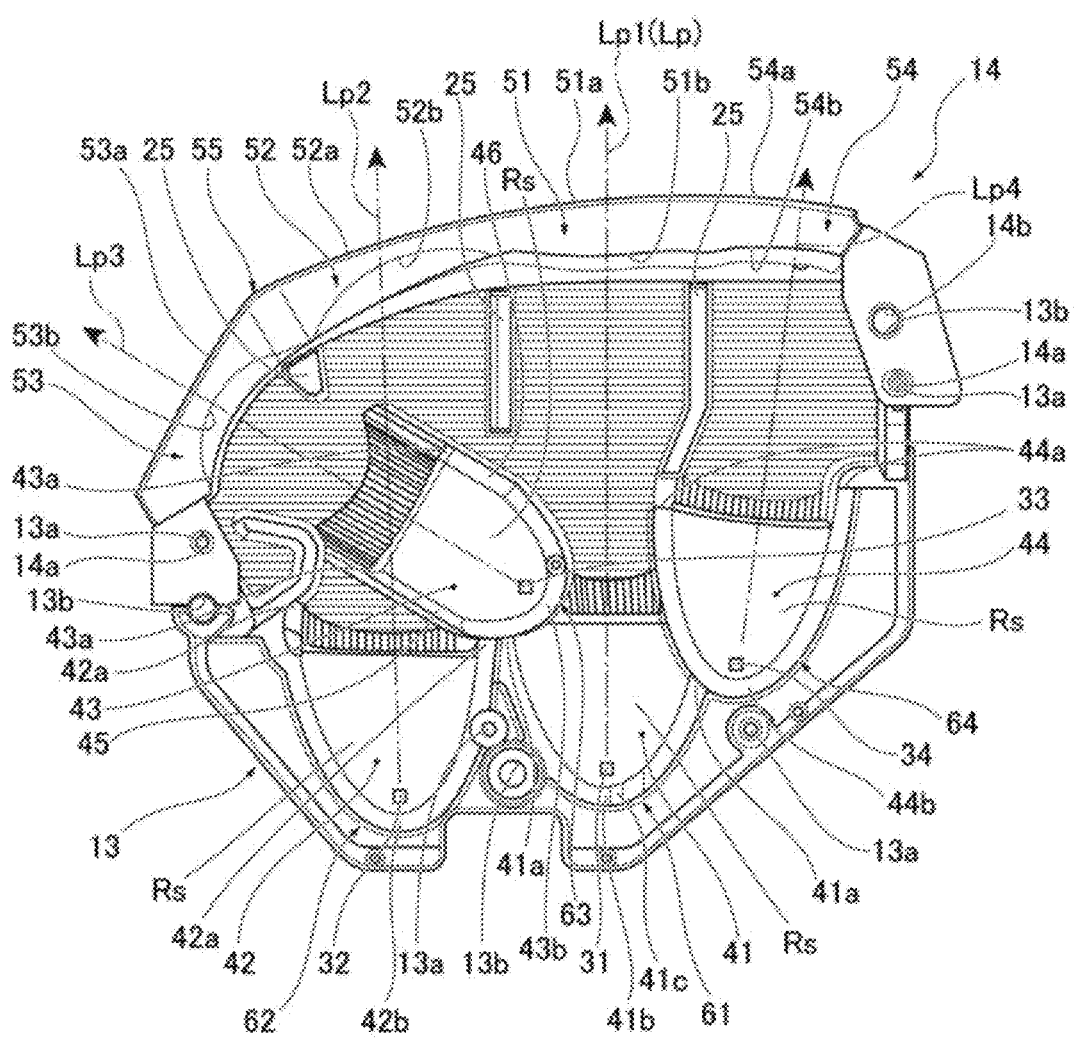
FIG. 4 is an explanatory diagram illustrating a positional relationship among a projection lens, a reflector member, and light sources as viewed from below in an up-down direction.
Figure 4:
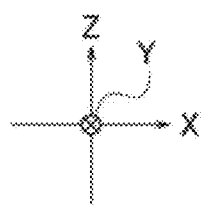

As illustrated in FIGS. 2 to 4, the reflector member 13 is provided with four positioning protrusions 13a and three screw holes 13b. Each positioning protrusion 13a is formed in a rod shape protruding downward in the up-down direction at a position where an optical path from each of the reflector portions (41 to 44) is not blocked. Each screw hole 13b is provided in the vicinity of the corresponding positioning protrusion 13a at a position where the optical path from each of the reflector portions (41 to 44) is not blocked, and can be fixed by screwing the screw 24. The reflector member 13 is fixed to the attachment member 11 by screwing the screw 24 into each screw hole 13b while being positioned by each positioning protrusion 13a in a state where the light source portion 12 is interposed between the reflector member 13 and the light source attachment portion 21. Then, since the light source portion 12 is fixed to an upper surface (21a) of the light source attachment portion 21 of the attachment member 11. the upper surface (21a) becomes an attachment surface 21a to which the light source portion 12 (the light sources (31 to 34) thereof) and the reflector portions (41 to 44) of the reflector member 13 are attached.

The reflector member 13 is provided with three partition wall portions 25. Each of the partition wall portions 25 is positioned between a first lens portion 51 and a second lens portion 52, between the second lens portion 52 and a third lens portion 53, and between the third lens portion 53 and a fourth lens portion 54, which will be described below, of the projection lens 14, and has a plate shape extending in the up-down direction. The partition wall portions 25 prevents light passing through each of the irradiation units (61 to 64), which will be described below, from traveling to an other adjacent irradiation unit.

As illustrated in FIGS. 3 to 6 and the like, the projection lens 14 projects light reflected by the reflector member 13 (each reflective surface Rs thereof) to the front of the vehicle, and forms a predetermined light distribution pattern in cooperation therewith. The projection lens 14 is a molded product made of a resin material, and is integrally provided with the first lens portion 51, the second lens portion 52, the third lens portion 53, and the fourth lens portion 54 (see FIG. 2, etc.). Each of the lens portions (51 to 54) is positioned at a position facing the corresponding reflector portion (41 to 44), i.e., in a direction in which the light from the corresponding light source (31 to 34) is reflected by the reflector portion (41 to 44). Specifically, in the projection lens 14, the fourth lens portion 54, the first lens portion 51, the second lens portion 52, and the third lens portion 53 are provided in this order from the inner side (a right side in FIG. 4 and a left side in FIG. 5) of the vehicle in the width direction.

In each of the lens portions (51 to 54), a focal point (rear focal point) is positioned near an inner wall section (41b to 44b), which will be described below, of the corresponding reflector portion (41 to 44). Each of the lens portions (51 to 54) irradiates light from the corresponding reflector portion (41 to 44), thereby forming, in an appropriately superimposed manner, a plurality of light distribution images of the inner wall section (41b to 44b) (predetermined area in the vicinity thereof) at positions according to optical characteristics on a screen where a horizontal line H and a vertical line V intersect with a center position O of irradiation by the vehicle lamp 10 as an origin. The optical characteristics can be set by adjusting a curvature (surface shape) of each of the lens portions (51 to 54) for each place, and in the first embodiment, the curvature is set to be gradually changed.

The first lens portion 51 is a convex lens, the second lens portion 52 is a concave lens, the third lens portion 53 is a concave lens, and the fourth lens portion 54 is a concave lens. The fourth lens portion 54 and the first lens portion 51 extend in the width direction. The second lens portion 52 adjacent to the first lens portion 51 is inclined slightly further rearward than the first lens portion 51 in such a way as to be displaced rearward as it extends toward the outer side. The third lens portion 53 adjacent to the second lens portion 52 is inclined rearward more largely than the second lens portion 52 in such a way as to be displaced rearward as it extends toward the outer side. An axis line of the third lens portion 53 of the first embodiment is aligned with a third projected optical axis Lp3, which will be described below, of the third reflector portion 43, and the third lens portion 53 is inclined outward at an angle between 40 degrees and 80 degrees with respect to the front-rear direction. The inclination is 60 degrees in the first embodiment. Thus, the projection lens 14, as a whole, is directed (slanted) rearward in the front-rear direction as it extends from the inner side to the outer side in the width direction, and has the same shape as the outer lens 15 (see FIG. 5), and therefore, the projection lens 14 can have an appearance with a sense of unity.

Herein, in the projection lens 14 of the first embodiment, the first lens portion 51 is a convex lens in which a first emission surface 51a is a substantially smooth curved surface and a first incident surface 51b is a convex surface that bulges toward the first light source 31 (first reflector portion 41) side. The second lens portion 52 is a concave lens in which a second emission surface 52a is a substantially smooth curved surface and a second incident surface 52b is a concave surface that is concave toward the side opposite to the second light source 32 (second reflector portion 42). Further, the third lens portion 53 is a concave lens in which a third emission surface 53a is a substantially smooth curved surface and a third incident surface 53b is a concave surface that is concave toward the side opposite to the third light source 33 (third reflector portion 43). The fourth lens portion 54 is a concave lens in which a fourth emission surface 54a is a substantially smooth curved surface and a fourth incident surface 54b is a concave surface that is concave toward the side opposite to the fourth light source 34 (fourth reflector portion 44). A curvature of each of the incident surfaces (51b to 54b) is set according to optical settings in each of the irradiation units (61 to 64) to be described below.

In the projection lens 14 of the first embodiment, the fourth emission surface 54a, the first emission surface 51a, and the second emission surface 52a are continuously arranged from the inner side in the width direction, which form a single curved surface. Herein, the single curved surface means that there is no bent section and a change in curvature is continuous. Thus, in the projection lens 14 of the first embodiment, although the first lens portion 51, the second lens portion 52, and the fourth lens portion 54 have different optical characteristics as will be described below, the fourth emission surface 54a, the first emission surface 51a, and the second emission surface 52a can be made to appear to form a single surface, thereby improving the appearance.

In addition, in the projection lens 14 of the first embodiment, the third emission surface 53a of the third lens portion 53 is a single curved surface. In addition, in the projection lens 14 of the first embodiment, a bent surface portion 55 is provided between the second lens portion 52 (the second emission surface 52a thereof) and the third lens portion 53 (the third emission surface 53a thereof). The bent surface portion 55 forms a bent and continuous section between the second emission surface 52a of the second lens portion 52 and the third emission surface 53a of the third lens portion 53. Namely, the second emission surface 52a and the third emission surface 53a are each formed as a single curved surface extending in different directions, but the emission surfaces are continuous while changing their directions by the bent surface portion 55. Thus, in the projection lens 14, the four emission surfaces (51a to 54a) can be formed into a unified and integrated design as a whole constituted by two smooth curved surfaces without irregularities, and can be formed to be directed (slanted) rearward as it extends toward the outer side. Further, in the projection lens 14, the second lens portion 52 can be made substantially orthogonal to a second projected optical axis Lp2 of a second irradiation unit 62 to be described below, and the third lens portion 53 can be made substantially orthogonal to a third projected optical axis Lp3 of a third irradiation unit 63 to be described below.

In addition, in the projection lens 14 of the first embodiment, a common reference curve that is smoothly continuous and gently curved is set on the incident surface side from the second lens portion 52 to the third lens portion 53, and the second incident surface 52b and the third incident surface 53b are concave surfaces that are recessed with respect to the reference curve. For this reason, the second incident surface 52b and the third incident surface 53b can be adjacent to each other without causing a step therebetween, and it is possible to prevent unintended light and dark from being formed on each light distribution pattern P due to light caused by the step. In addition, since the second incident surface 52b and the third incident surface 53b are mutually concave surfaces, it is possible to suppress light from one irradiation unit from being incident on the incident surface of the other irradiation unit, compared to a case where the incident surface of the one irradiation unit is a concave surface and the incident surface of the other irradiation unit is a convex surface.

As illustrated in FIGS. 2 to 4, the projection lens 14 is provided with two positioning holes 14a and one screw insertion hole 14b. Each positioning hole 14a is provided on both sides outside an area where the lens portions (51 to 54) are provided in the width direction, and the corresponding positioning protrusions 13a of the reflector member 13 can be fitted into the positioning holes 14a. The screw 24 can be inserted into the screw insertion hole 14b. The projection lens 14 is attached between the attachment member 11 (lens attachment portion 22) and the reflector member 13 by inserting each positioning protrusion 13a of the reflector member 13 into the positioning hole 14a and screwing the screw 24 inserted into the screw insertion hole 14b into the screw hole 13b of the reflector member 13. Thus, the projection lens 14 has a positional relationship in which each of the lens portions (51 to 54) is opposed to the corresponding reflector portion (41 to 44).

Next, the positional relationship between the reflector portions (41 to 44), and the like will be explained. First, each of the reflector portions (41 to 44) cooperates with the corresponding light source (31 to 34) and lens portion (51 to 54), thereby forming an irradiation unit for forming a predetermined light distribution pattern. In detail, the first reflector portion 41 constitutes a first irradiation unit 61 by the first light source 31 and the first lens portion 51, and the second reflector portion 42 constitutes a second irradiation unit 62 by the second light source 32 and the second lens portion 52. Further, the third reflector portion 43 constitutes a third irradiation unit 63 by the third light source 33 and the third lens portion 53, and the fourth reflector portion 44 constitutes a fourth irradiation unit 64 by the fourth light source 34 and the fourth lens portion 54.

Herein, in each of the irradiation units (61 to 64), an axis line of each of the reflector portions (41 to 44) is set as the projected optical axis Lp. The axis line (each projected optical axis Lp) is the major axis of a basic ellipse in each reflective surface Rs. Hereinafter, the axis line of the first irradiation unit 61 is referred to as a first projected optical axis Lp1, the axis line of the second irradiation unit 62 is referred to as a second projected optical axis Lp2, the axis line of the third irradiation unit 63 is referred to as a third projected optical axis Lp3, and the axis line of the fourth irradiation unit 64 is referred to as a fourth projected optical axis Lp4 (see FIG. 4).

Figure 5:
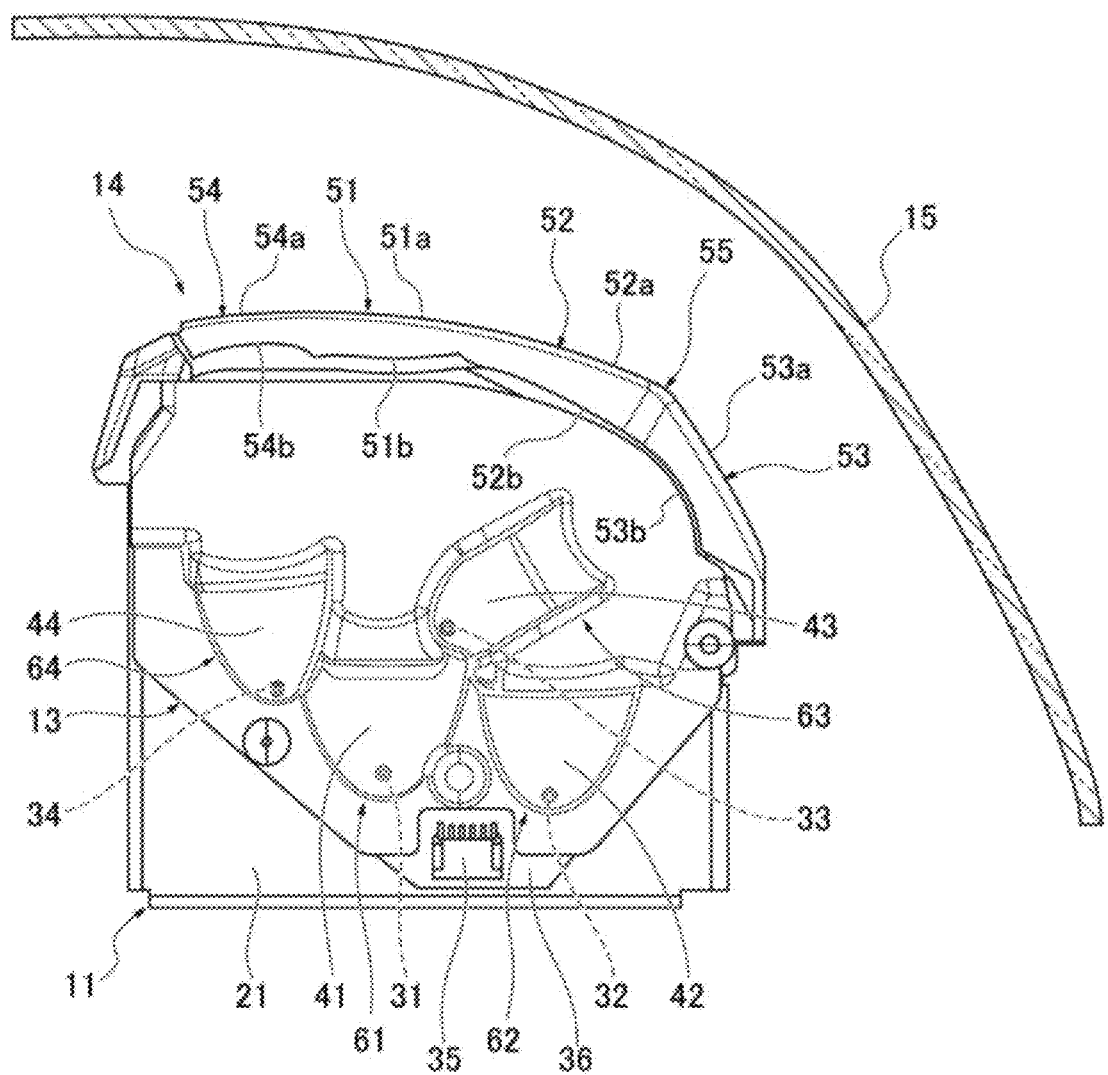
FIG. 5 is an explanatory diagram illustrating a positional relationship among a projection lens, a reflector member, and light sources as viewed from above in an up-down direction.
Figure 5:
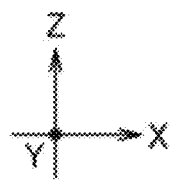

In the first irradiation unit 61, as illustrated in FIGS. 3 to 5 and the like, the first reflector portion 41 is provided on the center side in the width direction, and the first projected optical axis Lp1 is aligned with the front-rear direction. The first projected optical axis Lp1 also functions as the projected optical axis Lp in the vehicle lamp 10. The first reflector portion 41 is formed in a bowl shape on a horizontal plane, and an open end 41a from which light is emitted is positioned on the front side in the front-rear direction, and an inner wall section 41b, which is a vertex of the bowl shape, is positioned on the rear side in the front-rear direction. The first lens portion 51 of the projection lens 14 is positioned on the front side of the first reflector portion 41 in the front-rear direction, i.e., on the first projected optical axis Lp1.

Figure 6:
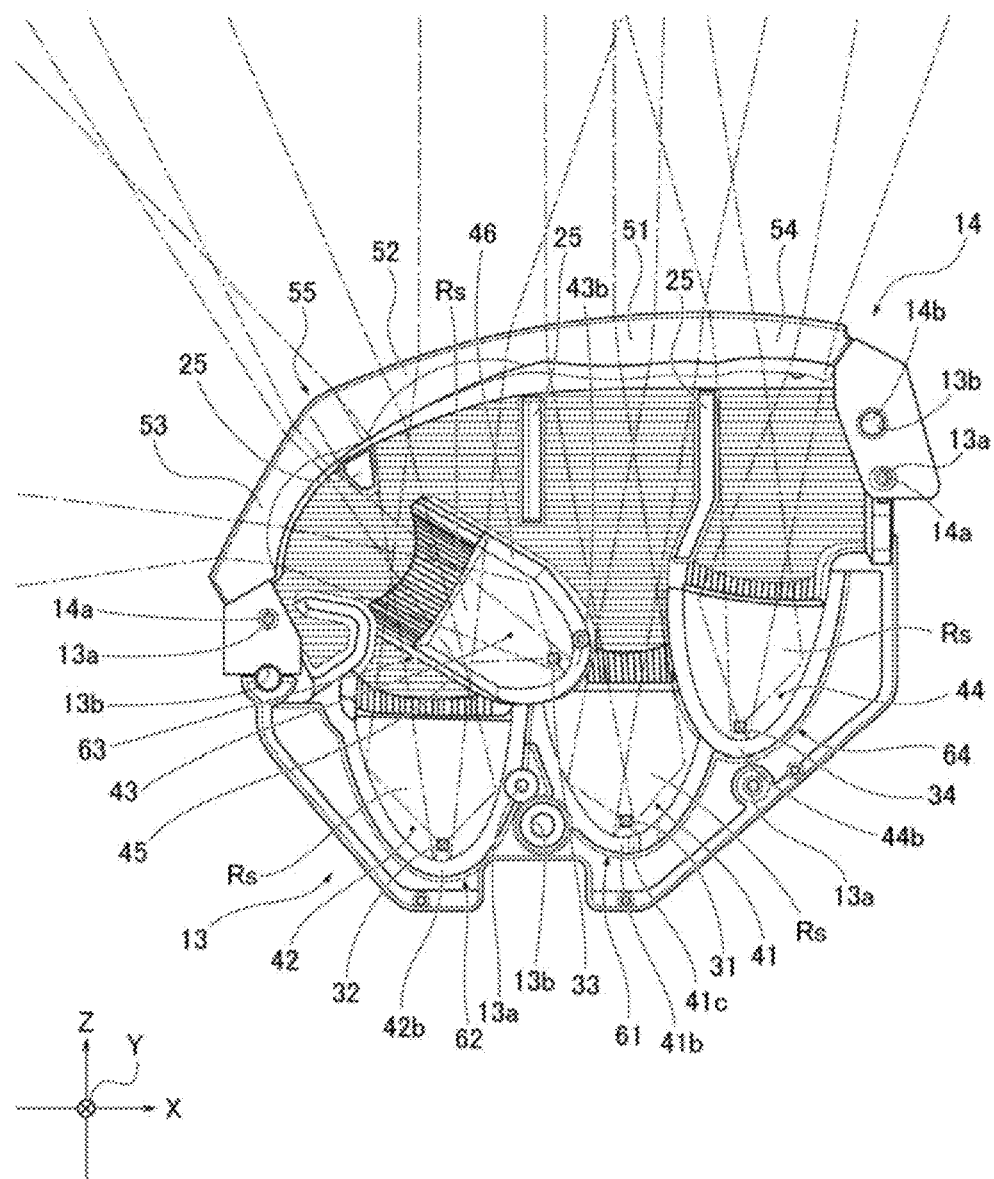
FIG. 6 is an explanatory diagram illustrating a state in which light from each light source illustrated in FIG. 4 is reflected by each reflector member and emitted from each lens portion.

In the first reflector portion 41, a lower end of the inner wall section 41b is a cutoff forming surface 41c (see FIGS. 3, 4, etc.). In order to form the cutoff line CL, the cutoff forming surface 41c has a shape in which two horizontal edges having different heights at the lower end are connected by an inclined edge. As illustrated in FIG. 6, the first reflector portion 41 reflects light from the first light source 31 located at (near) the first focal point of the reflective surface Rs toward the first lens portion 51. As illustrated in FIG. 4, the first lens portion 51 projects the light reflected by the first reflector portion 41 in a direction of the first projected optical axis Lp1. At this time, since the first lens portion 51 is formed as a convex lens, the light from the first reflector portion 41 is caused to travel in the direction of the first projected optical axis Lp1 while being collected. Then, the first lens portion 51 forms a light distribution image of the inner wall section 41*b* including the cutoff forming surface 41*c* on a screen where the horizontal line H and the vertical line V intersect with each other on the projected optical axis Lp (first projected optical axis Lp1). Even when the vehicle lamp 10 is provided on the left side of the vehicle, a relationship between a direction of inclination and a height of the cutoff forming surface 41*c* is not reversed in the width direction. Namely, the vehicle lamps 10 on the right and left sides of the vehicle are reversed in the width direction, but the inclinations of the cutoff forming surfaces 41*c* are set in the same direction.

Figure 7:
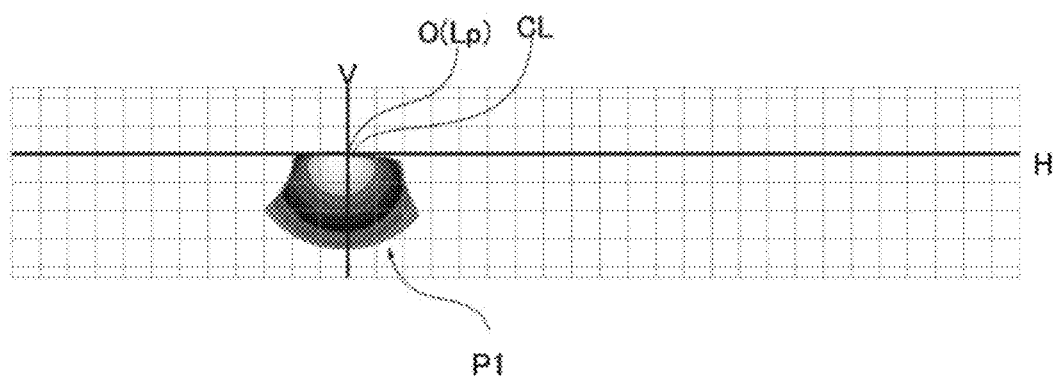
FIG. 7 is an explanatory diagram illustrating a first light distribution pattern formed by a first unit of the vehicle lamp.

Thus, as illustrated in FIG. 7, the first irradiation unit 61 forms a first light distribution pattern P1 as a collected light distribution pattern obtained by collecting the light from the first light source 31 on the above-described screen. In the first light distribution pattern P1, a cutoff line CL in which two horizontal edges having different heights are connected to each other by an inclined edge is provided on the upper side. The first light distribution pattern P1 positions the cutoff line CL on the projected optical axis Lp, emphasizes brightness by gathering light below the cutoff line CL, and clarifies the brightness and darkness of the cutoff line CL.

In the second irradiation unit 62, as illustrated in FIGS. 3 to 5 and the like, the second reflector portion 42 is provided adjacent to the first reflector portion 41 on the outer side in the width direction. The second projected optical axis Lp2 of the second reflector portion 42 is aligned with the front-rear direction or is slightly inclined further outward than the front-rear direction. The second reflector portion 42 is formed in a bowl shape on a horizontal plane, and an open end 42*a* from which light is emitted is positioned on the front side in the front-rear direction, and an inner wall section 42*b*, which is a vertex of the bowl shape, is positioned on the rear side in the front-rear direction. The second lens portion 52 of the projection lens 14 is positioned on the front side of the second reflector portion 42 in the front-rear direction, i.e., on the second projected optical axis Lp2. The second reflector portion 42 is located adjacent to the first reflector portion 41 further outward than the first reflector portion 41 in the width direction, and the second lens portion 52 is located adjacent to the first lens portion 51 further outward than the first lens portion 51 in the width direction.

As illustrated in FIG. 6, the second reflector portion 42 reflects light from the second light source 32 located at (near) the first focal point of the reflective surface Rs toward the second lens portion 52. As illustrated in FIG. 4, the second lens portion 52 projects the light reflected by the second reflector portion 42 onto the second projected optical axis Lp2. At this time, since the second lens portion 52 is a concave lens and the second projected optical axis Lp2 is slightly inclined outward, the light from the second reflector portion 42 is diffused and travels in a direction of the second projected optical axis Lp2, i.e., slightly further outward (to the left side in FIGS. 4 and 6) than the projected optical axis Lp (first projected optical axis Lp1) in the width direction. Then, the second lens portion 52 forms a plurality of light distribution images of the inner wall section 42*b* on the screen where the horizontal line H and the vertical line V intersect with each other on the projected optical axis Lp in an appropriately superimposed manner. In the second lens portion 52 of the first embodiment, a degree of concavity of the second incident surface 52*b* that is a concave surface, i.e., a curvature of the second incident surface 52*b*, is smaller than that of the third incident surface 53*b* and larger than that of the fourth incident surface 54*b*.

Figure 8:
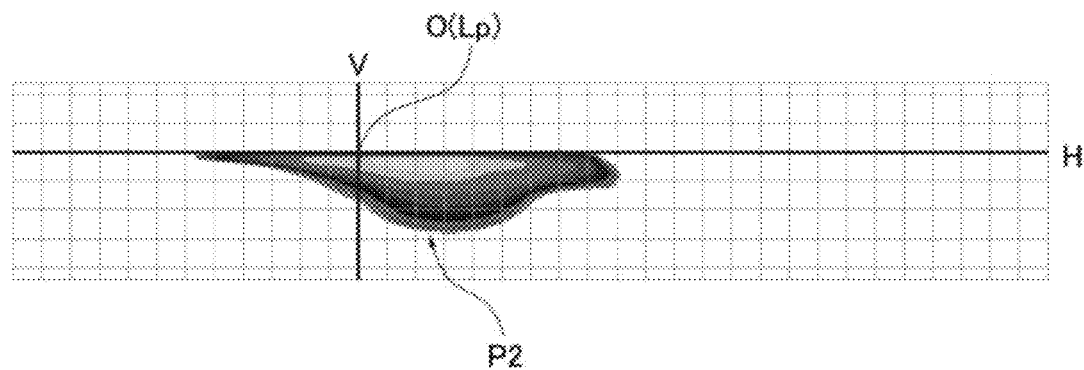
FIG. 8 is an explanatory diagram illustrating a second light distribution pattern formed by a second unit of the vehicle lamp.

As a result, as illustrated in FIG. 8, the second irradiation unit 62 forms a second light distribution pattern P2 as a large diffusion light distribution pattern in which the light from the second light source 32 is largely diffused on the above-described screen. In the second light distribution pattern P2, the center of brightness is positioned further outward (to the right side) than the projected optical axis Lp in the width direction. The second light distribution pattern P2 is largely expanded to the outer side of the first light distribution pattern P1 while partially overlapping with the first light distribution pattern P1 below the cutoff line CL of the first light distribution pattern P1, and brightens a wider area than the first light distribution pattern P1.

In the third irradiation unit 63, as illustrated in FIGS. 3 to 5 and the like, the third reflector portion 43 is provided between the first reflector portion 41 and the second reflector portion 42 in the width direction and on a front side of the first reflector portion 41 and the second reflector portion 42 in the front-rear direction. In other words, the third reflector portion 43 is positioned forward to a position in contact with the first reflector portion 41 (the open end 41*a* thereof) and the second reflector portion 42 (the open end 42*a* thereof) in the front-rear direction, thereby being positioned between the first reflector portion 41 and the second reflector portion 42 which are adjacent to each other in the width direction. The third projected optical axis Lp3 of the third reflector portion 43 is inclined outward at an angle between 40 degrees and 80 degrees with respect to the front-rear direction, and the inclination is 60 degrees in the first embodiment.

The third reflector portion 43 is formed in a bowl shape on a horizontal plane, and an open end 43*a* from which light is emitted is positioned on the front side in the front-rear direction, and an inner wall section 43*b*, which is a vertex of the bowl shape, is positioned on the rear side in the front-rear direction. The third lens portion 53 of the projection lens 14 is located at a position facing the third reflector portion 43, i.e., on the third projected optical axis Lp3. The third lens portion 53 is positioned further outward than the second lens portion 52 in the width direction as described above. This is because the third reflector portion 43 is positioned between the first reflector portion 41 and the second reflector portion 42 in the width direction, but the third projected optical axis Lp3 is inclined outward by 60 degrees. In this way, in the width direction, the order of arrangement of the second reflector portion 42 and the third reflector portion 43 and the order of arrangement of the second lens portion 52 and the third lens portion 53 are reversed. Therefore, optical paths (both projected optical axes Lp2 and Lp3) of the second irradiation unit 62 and the third irradiation unit 63 intersect with each other.

In addition, the third projected optical axis Lp3 is largely inclined, whereby the third reflector portion 43 is inclined largely outward with respect to the first reflector portion 41 and the second reflector portion 42. Therefore, in the third reflector portion 43, the vicinity of the inner wall section 43*b* (third light source 33) is positioned on the front side of the first light source 31 in the front-rear direction. Herein, an optical path of the first irradiation unit 61, i.e., a trajectory along which effective light from the first light source 31 used for forming the first light distribution pattern P1 is reflected by the first reflector portion 41 and travels to the first lens portion 51, is reduced in dimension in the width direction at an intermediate position from the first reflector portion 41 to the first lens portion 51 (see FIG. 6). The third reflector portion 43 is disposed on the front side of the first light source 31 in accordance with a mode of the optical path of the first irradiation unit 61 (the effective light trajectory described above) in such a way as to be able to suppress the traveling of the light in the first irradiation unit 61 from being blocked as much as possible. In other words, the position and size of the third reflector portion 43 on the optical path of the first irradiation unit 61 are set in such a way that the third reflector portion 43 can be suppressed from blocking the optical path of the first irradiation unit 61.

In addition, half or more of the third reflector portion 43 on the open end 43a side is positioned on an optical path of the second irradiation unit 62, i.e., on a trajectory along which effective light from the second light source 32 used for forming the second light distribution pattern P2 is reflected by the second reflector portion 42 and travels to the second lens portion 52. Herein, one side of the third reflector portion 43 with the third projected optical axis Lp3 interposed therebetween is located on the second light source 32 (second reflector portion 42) side, and the other side on the opposite side with the third projected optical axis Lp3 interposed therebetween is located on the second lens portion 52 side. In the third reflector portion 43, a light-source-side cutout portion 45 is provided on one second light source 32 side, and an opposite-side cutout portion 46 is provided on the other second lens portion 52 side. The light-source-side cutout portion 45 and the opposite-side cutout portion 46 are formed by partially cutting out the third reflector portion 43 in order to prevent the traveling of the light from the second light source 32, which is reflected by the second reflector portion 42 and travels toward the second lens portion 52, from being blocked. The light-source-side cutout portion 45 and the opposite-side cutout portion 46 of the first embodiment are cut out in a curved shape with the second projected optical axis Lp2 or the vicinity thereof as a center.

In the first embodiment, the optical path of the second irradiation unit 62 has a small dimension in the width direction at an intermediate position from the second reflector portion 42 to the second lens portion 52 (see FIG. 6). Therefore, the light-source-side cutout portion 45 is cut out larger than the opposite-side cutout portion 46, i.e., has a radius of curvature larger than that of the opposite-side cutout portion 46. In other words, the light-source-side cutout portion 45 is largely cut out and the opposite-side cutout portion 46 is cut out to be smaller than the light-source-side cutout portion 45 in such a way that the reflective surface Rs in the third reflector portion 43 is increased as much as possible while suppressing the optical path of the second irradiation unit 62 from being blocked, in the third reflector portion 43. Thus, the both cutout portions (45 and 46) can secure the optical paths of both the second irradiation unit 62 and the third irradiation unit 63 in a well-balanced manner, and can appropriately form both the second light distribution pattern P2 and a third light distribution pattern P3.

As illustrated in FIG. 6, the third reflector portion 43 reflects light from the third light source 33 located at (near) the first focal point of the reflective surface Rs toward the third lens portion 53. As illustrated in FIG. 4, the third lens portion 53 projects the light reflected by the third reflector portion 43 onto the third projected optical axis Lp3. At this time, since the third lens portion 53 is a concave lens and the third projected optical axis Lp3 is largely inclined outward, the light reflected by the third reflector portion 43 is diffused and travels in a third projected optical axis Lp3 direction, i.e., largely further outward (to the left side in FIGS. 4 and 6) than the projected optical axis Lp (first projected optical axis Lp1) in the width direction. The third lens portion 53 forms a plurality of light distribution images of the inner wall section 43b on a screen where the horizontal line H and the vertical line V intersect with each other on the projected optical axis Lp in an appropriately superimposed manner. In the third lens portion 53 of the first embodiment, a degree of concavity of the third incident surface 53b, i.e., a curvature of the third incident surface 53b is set to be large, compared to the other concave incident surfaces (52b and 54b).

Figure 9:
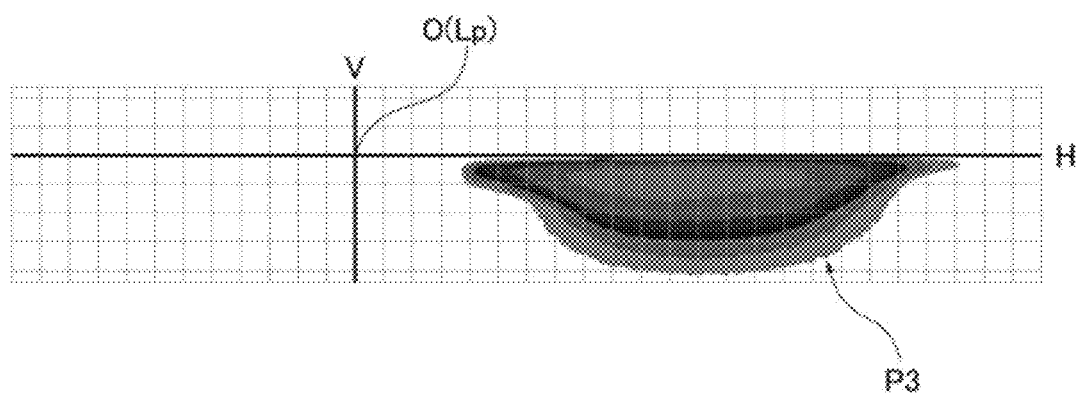
FIG. 9 is an explanatory diagram illustrating a third light distribution pattern formed by a third unit of the vehicle lamp.

Thus, as illustrated in FIG. 9, the third irradiation unit 63 diffuses the light from the third light source 33 to form a third light distribution pattern P3 on the above-described screen. In the third light distribution pattern P3, the center of brightness is positioned largely further outward (to the right side) than the projected optical axis Lp in the width direction. The third light distribution pattern P3 brightens a wide area on the outer side (right side) in the width direction while partially overlapping with the second light distribution pattern P2. The third light distribution pattern P3 can irradiate a side of a low-beam light distribution pattern LP to be described below (see FIG. 11), and functions as a so-called side light distribution pattern that can illuminate a position that can be a blind spot with only the low-beam light distribution pattern LP. In the first embodiment, the third light distribution pattern P3 brightens a range of 30 degrees to 90 degrees outward from the center position O (projected optical axis Lp) along the horizontal line H.

In the fourth irradiation unit 64, as illustrated in FIGS. 3 to 5 and the like, the fourth reflector portion 44 is provided adjacent to the first reflector portion 41 on the inner side of the first reflector portion 41 in the width direction. The fourth projected optical axis Lp4 of the fourth reflector portion 44 is aligned with the front-rear direction or is slightly inclined further inward than the front-rear direction. The fourth reflector portion 44 is formed in a bowl shape on a horizontal plane, and an open end 44a from which light is emitted is positioned on the front side in the front-rear direction, and an inner wall section 44b, which is a vertex of the bowl shape, is positioned on the rear side in the front-rear direction. The fourth lens portion 54 of the projection lens 14 is positioned on the front side of the fourth reflector portion 44 in the front-rear direction, i.e., on the fourth projected optical axis Lp4. Herein, the fourth reflector portion 44 is adjacent to the first reflector portion 41 on the inner side in the width direction, and the fourth lens portion 54 is adjacent to the first lens portion 51 on the inner side in the width direction.

As illustrated in FIG. 6, the fourth reflector portion 44 reflects light from the fourth light source 34 located at (near) the first focal point of the reflective surface Rs thereof toward the fourth lens portion 54. As illustrated in FIG. 4, the fourth lens portion 54 projects the light reflected by the fourth reflector portion 44 onto the fourth projected optical axis Lp4. At this time, since the fourth lens portion 54 is a concave lens and the fourth projected optical axis Lp4 is slightly inclined inward, the light reflected by the fourth reflector portion 44 is diffused and travels in a direction of the fourth projected optical axis Lp4, i.e., slightly further inward (to the right side in FIGS. 4 and 6) than the projected optical axis Lp (first projected optical axis Lp1) in the width direction. Then, the fourth lens portion 54 forms a plurality of light distribution images of the inner wall section 44b on the screen where the horizontal line H and the vertical line V intersect with each other on the projected optical axis Lp in an appropriately superimposed manner. In the fourth lens portion 54 of the first embodiment, a degree of concavity of the fourth incident surface 54b that is a concave surface, i.e., a curvature of the fourth incident surface 54b is set to be small, compared to the other concave incident surfaces (52b and 53b).

Figure 10:
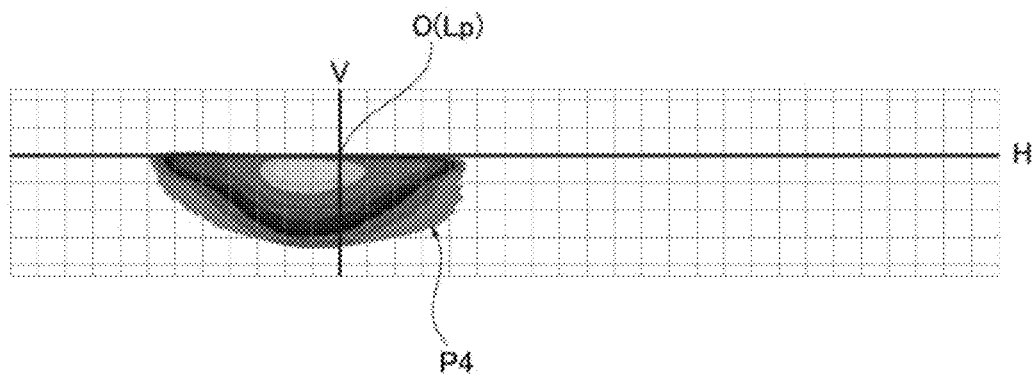
FIG. 10 is an explanatory diagram illustrating a fourth light distribution pattern formed by a fourth unit of the vehicle lamp.

Accordingly, as illustrated in FIG. 10, the fourth irradiation unit 64 forms a fourth light distribution pattern P4 as a medium diffusion light distribution pattern in which the light from the fourth light source 34 is diffused on the above-described screen. In the fourth light distribution pattern P4, the center of brightness is positioned further inward (to the left side) than the projected optical axis Lp in the width direction. The fourth light distribution pattern P4, below the cutoff line CL of the first light distribution pattern P1, includes substantially the entire area of the first light distribution pattern P1 and expands largely to the left side of the first light distribution pattern P1, and brightens an area wider than the first light distribution pattern P1.

Figure 11:
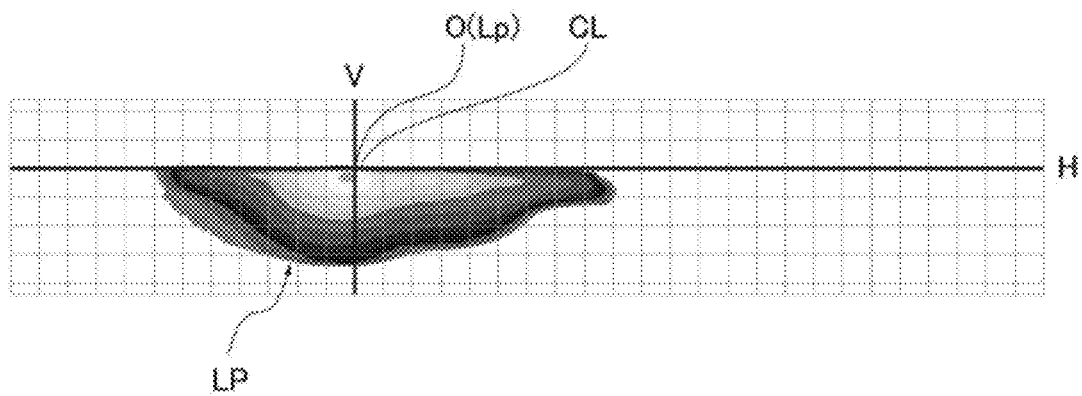
FIG. 11 is an explanatory diagram illustrating a low-beam light distribution pattern.

The vehicle lamp 10 can form the low-beam light distribution pattern LP as illustrated in FIG. 11 by turning on the first light source 31, the second light source 32, and the fourth light source 34 and simultaneously forming and superimposing the first light distribution pattern P1, the second light distribution pattern P2, and the fourth light distribution pattern P4. The low-beam light distribution pattern LP has a cutoff line CL on the projected optical axis Lp, and can brighten a large area in the width direction below the cutoff line CL while making the vicinity of the projected optical axis Lp brightest.

Figure 12:
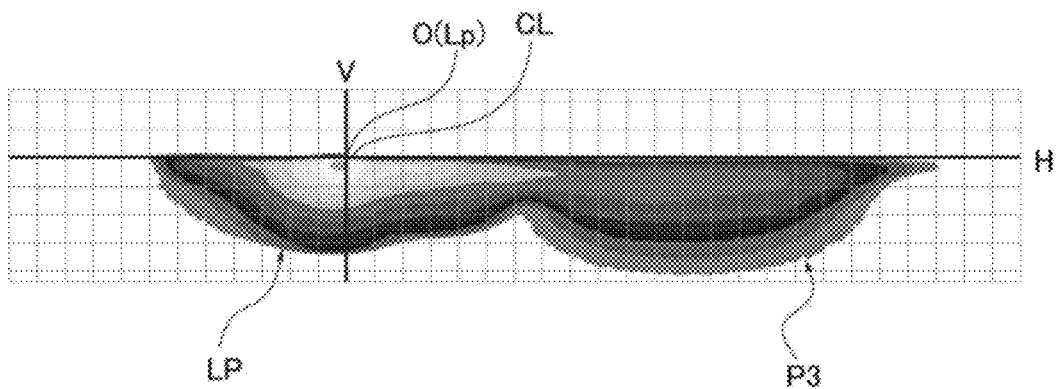
FIG. 12 is an explanatory diagram illustrating a state in which a low-beam light distribution pattern and a third light distribution pattern are formed.

In a state where the low-beam light distribution pattern LP is formed, the vehicle lamp 10 turns on the third light source 33 and forms the third light distribution pattern P3, thereby making it possible to brighten the outer side (right side in FIG. 12) of the low-beam light distribution pattern LP while partially overlapping with the low-beam light distribution pattern LP as illustrated in FIG. 12. As a result, the vehicle lamp 10 can secure a wide field of view on the right side of the low-beam light distribution pattern LP in addition to the low-beam light distribution pattern LP. Herein, when the steering wheel of a vehicle on which the vehicle lamp 10 is mounted is turned largely to the right or a right blinker is turned on, the vehicle lamp 10 turns on the third light source 33 in conjunction with such operations. Thus, it is possible to automatically secure a wide range of field of view according to the operation of the vehicle, and to appropriately support driving. In addition, the vehicle lamp 10 may form the third light distribution pattern P3 by turning on the third light source 33 in response to an operation on an operation portion for turning on the third light source 33 provided in the vehicle. Further, the vehicle lamp 10 may always form the third light distribution pattern P3 when forming the low-beam light distribution pattern LP. When the vehicle lamp 10 is provided on the left side of the vehicle, the third light distribution pattern P3 is formed on the left side of the low-beam light distribution pattern LP in conjunction with an operation of turning the steering wheel largely to the left or an operation of turning on a left blinker.

The vehicle lamp 10 integrally includes the third irradiation unit 63 that forms the third light distribution pattern P3 in addition to the first irradiation unit 61, the second irradiation unit 62, and the fourth irradiation unit 64 that form the low-beam light distribution pattern LP. Therefore, when the vehicle lamp 10 is mounted on the vehicle, it is possible to eliminate an adjustment operation for positioning between the irradiation units (61 to 64), and it is possible to increase accuracy of the relative positional relationship between the irradiation units (61 to 64). In addition, in the vehicle lamp 10, it is possible to reduce the number of parts for attachment and to simplify the attachment work, compared to a case where the irradiation units (61 to 64) are individually mounted on the vehicle.

In addition, in order to form the low-beam light distribution pattern LP, the vehicle lamp 10 is provided with the first lens portion 51 that forms the first light distribution pattern P1 by collecting light from the first light source 31 and the second lens portion 52 that forms the second light distribution pattern P2 by diffusing the light from the second light source 32 in the projection lens 14. In the projection lens 14, the first lens portion 51 and the second lens portion 52 are provided adjacent to each other in sequence from the inner side in the width direction. The vehicle lamp 10 forms the low-beam light distribution pattern LP (also the fourth light distribution pattern P4 in the first embodiment) by simultaneously forming the first light distribution pattern P1 having the cutoff line CL by the innermost first lens portion 51 and the second light distribution pattern P2 formed by the second lens portion 52 further outside than the first lens portion 51. In this way, since the vehicle lamp 10 forms the cutoff line CL by the light from the first lens portion 51 on the inner side, it is possible to easily and clearly form the cutoff line CL in the low-beam light distribution pattern LP formed in front of the vehicle. Further, since the vehicle lamp 10 forms the second light distribution pattern P2 by the light from the second lens portion 52 further outside than the first lens portion 51, it is possible to easily make the second light distribution pattern P2 larger than the first light distribution pattern P1. These are because the first lens portion 51 on the inner side is more advantageous in gathering light around the cutoff line CL located in front of the vehicle, and the second lens portion 52 on the outer side is more advantageous in diffusing the light while at least partially overlapping with the first light distribution pattern P1. Therefore, the vehicle lamp 10 can form the first light distribution pattern P1 and the second light distribution pattern P2 at the same time, thereby forming an appropriate low-beam light distribution pattern LP that irradiates a large area while emphasizing the cutoff line CL.

Furthermore, the vehicle lamp 10 is provided with the third irradiation unit 63 that forms the third light distribution pattern P3 for irradiating a side of the low-beam light distribution pattern LP, and the third lens portion 53 is provided adjacent to the outer side of the second lens portion 52 in the width direction, in the projection lens 14. Therefore, in the vehicle lamp 10, an optical path from the second light source 32 to the second lens portion 52 and an optical path from the third light source 33 to the third lens portion 53 can be made to intersect with each other. Accordingly, the vehicle lamp 10 forms the third light distribution pattern P3 by emitting the light from the third light source 33 further inside than the second light source 32 from the third lens portion 53 further outside than the second lens portion 52, and thus the third light distribution pattern P3 can be easily positioned on the outer side of the first light distribution pattern P1 or the second light distribution pattern P2. Therefore, the vehicle lamp 10 can appropriately form the low-beam light distribution pattern LP having the cutoff line CL and the third light distribution pattern P3 on the side of the low-beam light distribution pattern LP.

Next, in the vehicle lamp 10, the projection lens 14 is directed (slanted) rearward in the front-rear direction as it extends from the inner side to the outer side in the width direction. Therefore, in the vehicle lamp 10, since a distance between the second reflector portion 42 and the second lens portion 52 in the second irradiation unit 62 can be made smaller than that in the first irradiation unit 61 or the fourth irradiation unit 64, a focal length of the second lens portion 52 can be made smaller. Thus, the second irradiation unit 62 can easily diffuse the light from the second light source 32, compared to a case where the second irradiation unit 62 is disposed at the position of the first irradiation unit 61. In addition, since the second lens portion 52 is inclined slightly further rearward than the first lens portion 51, the second irradiation unit 62 can easily form the second light distribution pattern P2 that is largely expanded while the center of brightness is positioned further outward than the projected optical axis Lp in the width direction.

In addition, in the vehicle lamp 10, since the projection lens 14 is slanted as described above, a distance between the first reflector portion 41 and the first lens portion 51 in the first irradiation unit 61 can be made larger than that in the second irradiation unit 62. Therefore, a focal length of the first lens portion 51 can be increased. For this reason, by disposing the first irradiation unit 61 further inward than the second irradiation unit 62. it is possible to easily collect the light from the first light source 31 compared to a case where the first irradiation unit 61 is disposed at the position of the second irradiation unit 62. In addition, since the first lens portion 51 of the first irradiation unit 61 extends along the width direction, it is possible to easily form the center of brightness of the first light distribution pattern P1, in which the brightness is emphasized by gathering light and the cutoff line is clarified, in the vicinity of the projected optical axis Lp.

Herein, a technical problem of a conventional vehicle lamp will be explained. The conventional vehicle lamp is provided with a low-beam light distribution unit and an additional light distribution unit, whereby an additional light distribution pattern (a third light distribution pattern P3 in the present invention) beside a low-beam light distribution pattern is formed. In this conventional vehicle lamp, the additional light distribution unit is disposed on the outer side of the low-beam light distribution unit, which leads to an increase in size. In particular, in the conventional vehicle lamp, the low-beam light distribution unit is provided on the inner side in the width direction while facing the front side in the front-rear direction, and the additional light distribution unit is provided on the outer side in the width direction while being inclined outward with respect to the front-rear direction. Therefore, in the conventional vehicle lamp, a large gap is formed between emission positions of the low-beam light distribution unit and the additional light distribution unit, and an inner panel is provided in the gap to cover the gap. As a result, in the conventional vehicle lamp, a non-lighting section is provided between lighting sections, and there is room for improvement from the viewpoint of improving the appearance.

In contrast, in the vehicle lamp 10 of the present disclosure, the first reflector portion 41 and the second reflector portion 42 are provided adjacent to each other in the width direction on the attachment surface 21a of the attachment member 11, and the third reflector portion 43 is provided between the first reflector portion 41 and the second reflector portion 42 in the width direction and on the front side in the front-rear direction. Therefore, in the vehicle lamp 10, the three reflector portions (41, 42, and 43) are not simply arranged in the width direction, but are disposed in such a way as to be shifted also in the front-rear direction, whereby the reflector portions can be provided by efficiently using the attachment surface 21a, and an increase in size can be suppressed.

In particular, in the vehicle lamp 10, the third projected optical axis Lp3 of the third reflector portion 43, which forms the third light distribution pattern P3 that irradiates the side of the low-beam light distribution pattern LP, is inclined outward by 60 degrees with respect to the front-rear direction. Therefore, in the vehicle lamp 10, since the third reflector portion 43 is provided in front of the first reflector portion 41 and the second reflector portion 42 in which the projected optical axes (Lp1 and Lp2) are substantially along the front-rear direction in order to form the low-beam light distribution pattern LP, the emission positions of light from the three irradiation units (61 to 63) can be made close to each other. Therefore, in the vehicle lamp 10, the three lens portions (51 to 53) of the projection lens 14 can be arranged adjacent to each other, and the appearance can be improved compared to the above-described conventional vehicle lamp. Herein, in the vehicle lamp 10, the partition wall portion 25 is provided between the respective lens portions (51 to 54), but each partition wall portion 25 prevents light passing through each irradiation unit (61 to 64) from traveling to the other adjacent irradiation unit and do not hide the light, and thus deterioration of the appearance is suppressed.

The vehicle lamp 10 as an example of the vehicle lamp according to the present disclosure can acquire the following effects.

In the vehicle lamp 10, the second light distribution pattern P2 is formed simultaneously with the first light distribution pattern P1, thereby forming at least a part of the low-beam light distribution pattern LP, and the first reflector portion 41 and the second reflector portion 42 are provided on the attachment surface 21a in such a way as to be adjacent to each other in the width direction of the vehicle. The third reflector portion 43 is provided on the attachment surface 21a between the first reflector portion 41 and the second reflector portion 42 in the width direction and on the front side of the first reflector portion 41 and the second reflector portion 42 in the front-rear direction of the vehicle. Therefore, in the vehicle lamp 10, the three reflector portions (41, 42, and 43) are not simply arranged in the width direction, but are disposed in such a way as to be shifted also in the front-rear direction, whereby the reflector portions can be provided by efficiently using the attachment surface 21a, and an increase in size can be suppressed.

In addition, in the vehicle lamp 10, the first reflector portion 41 is provided further inward than the second reflector portion 42 in the width direction. Therefore, since the vehicle lamp 10 forms the cutoff line CL by the light from the first reflector portion 41 on the inner side, it is possible to easily and clearly form the cutoff line CL in the low-beam light distribution pattern LP formed in front of the vehicle. Further, since the vehicle lamp 10 forms the second light distribution pattern P2 by the light from the second reflector portion 42 further outside than the first lens portion 51, it is possible to easily make the second light distribution pattern P2 larger than the first light distribution pattern P1.

Further, in the vehicle lamp 10, a first axis line (the first projected optical axis Lp1) of the first reflector portion 41 is along the front-rear direction, and a third axis line (the third projected optical axis Lp3) of the third reflector portion 43 is inclined outward at an angle between 40 degrees and 80 degrees with respect to the front-rear direction. Therefore, in the vehicle lamp 10, the traveling direction of the light from the second reflector portion 42 and the traveling direction of the light from the third reflector portion 43 can be made to intersect with each other, and the emission positions of the two lights can be brought close to each other.

In the vehicle lamp 10, the third reflector portion 43 is disposed such that the third light source 33 is positioned on the front side of the first reflector portion 41 in the front-rear direction. Therefore, in the vehicle lamp 10, it is possible to provide the third reflector portion 43 (third light source 33) by efficiently using the attachment surface 21a while suppressing the traveling of the light from the first reflector portion 41 from being blocked.

In the vehicle lamp 10, the light-source-side cutout portion 45 is provided on the second light source 32 side in the third reflector portion 43, and the opposite-side cutout portion 46 is provided on the opposite side. The opposite-side cutout portion 46 is smaller than the light-source-side cutout portion 45. Therefore, the vehicle lamp 10 can secure the optical path for the light from the second reflector portion 42 and the optical path for the light from the third reflector portion 43 in a well-balanced manner, and can appropriately form both the second light distribution pattern P2 and the third light distribution pattern P3.

The vehicle lamp 10 further includes the fourth reflector portion 44 that reflects light emitted from the fourth light source 34, thereby forming a fourth light distribution pattern P4. The fourth reflector portion 44 is provided adjacent to the first reflector portion 41 in the width direction. Therefore, since the vehicle lamp 10 can form the fourth light distribution pattern P4 in addition to the first light distribution pattern P1, the second light distribution pattern P2, and the third light distribution pattern P3, it is possible to more finely adjust the size and brightness distribution of the light distribution pattern to be formed.

The vehicle lamp 10 further includes the projection lens 14 that projects light from the first reflector portion 41, the second reflector portion 42, and the third reflector portion 43. The projection lens 14 includes a first lens portion 51 that collects the light from the first reflector portion 41, a second lens portion 52 that diffuses the light from the second reflector portion 42, and a third lens portion 53 that diffuses the light from the third reflector portion 43. In the projection lens 14, the first lens portion 51, the second lens portion 52, and the third lens portion 53 are adjacent to each other in sequence from the inner side in the width direction. Therefore, in the vehicle lamp 10, an optical path from the second reflector portion 42 toward the second lens portion 52 and an optical path from the third reflector portion 43 toward the third lens portion 53 can be made to intersect with each other. Thus, the vehicle lamp 10 can be downsized as a whole, and the low-beam light distribution pattern LP having the cutoff line CL and the third light distribution pattern P3 beside the low-beam light distribution pattern LP can be appropriately formed.

Therefore, the vehicle lamp 10 of the first embodiment as the vehicle lamp according to the present disclosure can form the low-beam light distribution pattern LP and the third light distribution pattern P3 as an additional light distribution pattern on the side of the low-beam light distribution pattern LP while suppressing an increase in size.

Although the vehicle lamp according to the present disclosure has been explained above based on the first embodiment, the specific configuration is not limited to the first embodiment, and design changes, additions, and the like are allowed without departing from the gist of the invention according to each claim in the scope of claims.

In the first embodiment described above, light is controlled by the reflector member 13 and the projection lens 14 to form a predetermined light distribution pattern. However, the light distribution pattern may be controlled by only the reflector member, may be controlled by only the projection lens, or an other configuration may also be used, and the configuration is not limited to that of the first embodiment described above.

In the first embodiment, the first light distribution pattern P1, the second light distribution pattern P2, and the fourth light distribution pattern P4 are formed at the same time, thereby forming the low-beam light distribution pattern LP. However, the low-beam light distribution pattern LP may be formed by the first light distribution pattern P1 and the second light distribution pattern P2, and is not limited to the configuration of the first embodiment. In this case, the first light distribution pattern P1 may be used as a main pattern, and the second light distribution pattern P2 may be used as an auxiliary pattern. Namely, the first light distribution pattern P1 can satisfy the regulation required for the low-beam light distribution pattern LP. Since the second light distribution pattern P2 is formed simultaneously with the first light distribution pattern P1, the second light distribution pattern P2 can form at least a part of the low-beam light distribution pattern LP in order to further improve the field of view during traveling.

DESCRIPTION OF REFERENCE NUMERALS

10 Vehicle lamp
11 Attachment member
21a Attachment surface
14 Projection lens
31 First light source
32 Second light source
33 Third light source
34 Fourth light source
41 First reflector portion
42 Second reflector portion
43 Third reflector portion
44 Fourth reflector portion
45 Light-source-side cutout portion
46 Opposite-side cutout portion
51 First lens portion
52 Second lens portion
53 Third lens portion
CL Cutoff line
LP Low-beam light distribution pattern
Lp1 First projected optical axis (as an example of the axis line of the first reflector portion 41)
Lp3 Third projected optical axis (as an example of the axis line of the third reflector portion 43)
P1 First light distribution pattern
P2 Second light distribution pattern
P3 Third light distribution pattern
P4 Fourth light distribution pattern
Rs Reflective surface

The invention claimed is:

1. A vehicle lamp comprising:
a first reflector portion that reflects light emitted from a first light source, irradiates a front of a vehicle, and forms a first light distribution pattern having a cutoff line:
a second reflector portion that reflects light emitted from a second light source and that forms a second light distribution pattern larger than the first light distribution pattern in front of the vehicle:
a third reflector portion that reflects light emitted from a third light source and that forms a third light distribution pattern on a side of the first light distribution pattern or the second light distribution pattern; and
an attachment member to which the first light source, the second light source, and the third light source are attached on an attachment surface, wherein the second light distribution pattern is formed simultaneously with the first light distribution pattern and thereby forms at least a part of a low-beam light distribution pattern, the first reflector portion and the second reflector portion are provided on the attachment surface in such a way as to be adjacent to each other in a width direction of the vehicle, and the third reflector portion is provided on the attachment surface between the first reflector portion and the second reflector portion in the width direction and in a front side of the first reflector portion and the second reflector portion in a front-rear direction of the vehicle.

2. The vehicle lamp according to claim 1, wherein the first reflector portion is provided further inward than the second reflector portion in the width direction.

3. The vehicle lamp according to claim 1, wherein
the first reflector portion has a first axis line along the front-rear direction; and
the third reflector portion has a third axis line inclined outward at an angle between 40 degrees and 80 degrees with respect to the front-rear direction.

4. The vehicle lamp according to claim 1, wherein the third reflector portion is disposed such that the third light source is positioned on a front side of the first reflector portion in the front-rear direction.

5. The vehicle lamp according to claim 1, wherein
the third reflector portion has a light-source-side cutout portion provided on a second light source side, and has an opposite-side cutout portion provided on a side opposite to the second light source side across a third axis line of the third reflector portion, and
the opposite-side cutout portion is cut out to be smaller than the light-source-side cutout portion.

6. The vehicle lamp according to claim 1, further comprising a fourth reflector portion that reflects light emitted from a fourth light source and that forms a fourth light distribution pattern that is larger than the first light distribution pattern and smaller than the second light distribution pattern in front of the vehicle, wherein
the fourth reflector portion is provided adjacent to the first reflector portion in the width direction.

7. The vehicle lamp according to claim 1, further comprising a projection lens that projects light from the first reflector portion, the second reflector portion, and the third reflector portion, wherein
the projection lens includes a first lens portion that collects the light from the first reflector portion, a second lens portion that diffuses the light from the second reflector portion, and a third lens portion that diffuses the light from the third reflector portion, and the first lens portion, the second lens portion, and the third lens portion are adjacent to each other in sequence from an inner side of the projection lens in the width direction.

* * * * *